Dec. 15, 1964  M. D. CORLEY  3,160,978
PLUG DISLODGING AND RETRIEVING DEVICE
Filed March 5, 1963
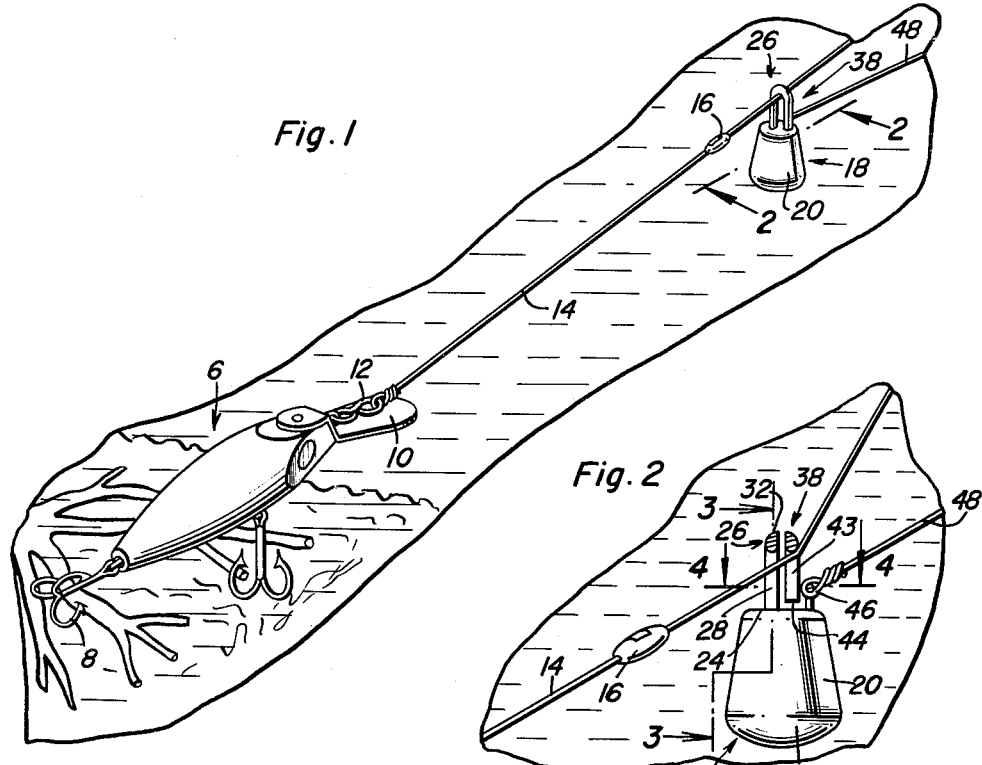
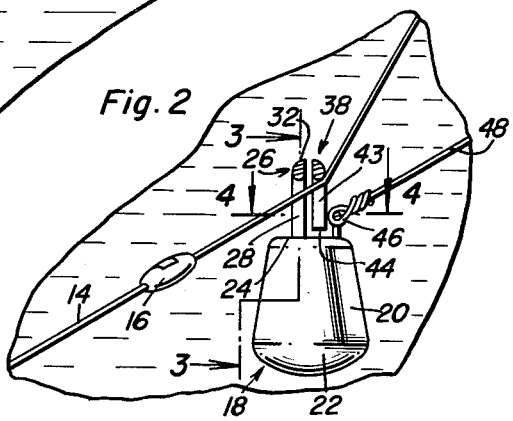
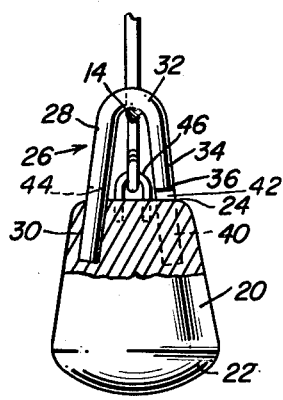
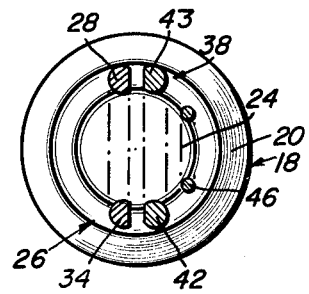
Marshall D. Corley
INVENTOR.
BY *Clarence A. O'Brien*
*and Harvey B. Jackson*
Attorneys

3,160,978
PLUG DISLODGING AND RETRIEVING DEVICE
Marshall D. Corley, P.O. Box 654, Hampton, Ark.
Filed Mar. 5, 1963, Ser. No. 262,952
2 Claims. (Cl. 43—17.2)

This invention relates to an improved fishhook and hook-equipped fishing plug dislodging and line and plug retrieving device which, like prior art retrievers, is detachably connectible to the in-use line, slides down the line under forces of gravity, forcibly strikes the snagged plug and loosens it for recovery in a well-known manner.

It is common to the art to provide a weighted body of a size and shape which lends itself to downward travel on the fishing line and which is detachably and slidingly mounted on the snagged line. It is also desirable to provide a captive line the downwardly descending leading end of which is attached in one manner or another to the gravity lowerable body and to use the same in a well-known lifting and lowering manner for hammering the weighted body against the snagged plug or hook as the case may be. Then, too, it is prevailing practice to provide the body with a pigtail coil or equivalent connector which is detachably connectible with the fishing line.

It is desirable to have the above background information in mind and, if desired, to refer to an exemplary prior art adaptation, namely the Consolo et al. Patent 2,553,173.

It is an object of the present endeavor to improve upon prior art plug dislodging and retrieving devices. To this end and as will be hereinafter more fully clarified the present invention has to do with a small streamlined weight which usually weighs about five ounces and is yet heavy enough to descend the fishing line, strike the retrievable plug (almost any average size plug) and to loosen it or the hook means thereon sufficiently for ready recovery.

The invention is also regarded as an improvement in that the construction is such that it can be satisfactorily operated with one hand, is simple to attach and detach. It has no side-projecting line-attaching devices or surface projections which would interfere with the downward travel on the fishing line or, piloting and passage of the leading end through restricted spaces. By being free of side-position line-attaching means the plug is consequently easy to handle and store in an angler's tackle box.

Further, in carrying out the preferred embodiment of the invention a structural adaptation has been devised wherein spaced parallel suitably paired hook-like members are attached to a trailing flat end of the device, these being readily attachable to the fishing line for linked sliding connection therewith. Also these members or devices are readily detachable from the fishing line and are such in size that they do not protrude but, instead, are confined within the circle defined by the marginal edge of the end to which they are attached.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective showing a hook-equipped snagged fishing plug, the sinker-equipped line attached thereto, the improved plug dislodging and retrieving device and the captive line which is connected at its lower or leading end thereto.

FIG. 2 is a view enlarged compared to FIG. 1 and in section and elevation and showing the essential parts, the manner in which they are constructed and cooperate, the view being taken approximately on the plane of the section line 2—2 of FIG. 1.

FIG. 3 is a vertical section on the irregular section line 3—3 of FIG. 2.

And FIG. 4 is a section on an enlarged scale, compared to FIG. 2 and which is taken approximately on the plane of the section line 4—4 of FIG. 2.

With reference first to the over-all ready-to-use assemblage (FIG. 1) the numeral 6 designates a fishing plug or an equivalent lure having at least one fishhook 8 attached thereto with the fishhook illustrated as accidentally caught on the limbs, twigs or other component parts of what is here referred to as the snag. The plug is shown provided with a baffle 10 at the leading end, eye means 12 and a fishing line 14 as well as a sinker 16.

The plug loosening, dislodging and recovery device is denoted generally by the numeral 18. It comprises a truncated conical or an equivalent weight or body 20 which is circular in cross section from end-to-end. The larger or basal end (in reference to the views of the drawing) is circular in plan but convex as indicated at 22. The smaller opposite or trailing end is planar and commonly said to be flat and circular in plan as denoted at 24. It will be noted that the surface 22 and also the side surfaces of the body are wholly free of projections. Only the flat end portion 24 is so constructed that it may be detachably and slidingly connected with the fishing line. This attaching means is within the confines of the circle defined by the outer perimeter or margin of the flat end 24 and no component parts project beyond the peripheral surface 20. The means preferred to accomplish the result desired is preferably of the construction illustrated in the views of the drawing. Briefly, this means comprises a pair of companion or complemental attaching and retaining hooks 26 and 38. These hooks have end portions anchored and adjacent faces disposed in spaced apart parallelism as illustrated in both FIGS. 2 and 4. Although both hooks are structurally the same it may be helpful for sake of distinction to refer to them separately. Therefore, it will be noted in FIG. 3 for example that one leg of the hook 26 is denoted at 28 and has its end portion 30 anchored in the body 20. The curvate bight portion 32 and extending terminal portion 34 cooperate with 28 in defining a hook and it will be noted that the free terminal end of the bill portion 34, denoted at 36 is spaced from the surface 24 to facilitate engaging this particular hook with the fishing line. The other attaching hook 38 is basically the same as the hook 26 in that it has the lower end portion 40 of the shank 42 embedded and anchored, has its other terminal end portion fashioned into a bill 43 which is spaced as at 44 in the manner shown. The opposed surfaces of the respective hooks 26 and 28 are flattened and a space of suitable size intervenes in the manner illustrated. It follows that the opening to the hook 26 is on the right (observing FIG. 3 for example) while the opening of the complemental hook 38 is on the left. In addition a clevis or an equivalent attaching member 46 is provided and it is to this that the lower end of the retrieving line 48 is connected.

It is generally well recognized that most streams and lakes which are commonly fished are usually well stocked with stumps, logs, trees, undergrowth and equivalent snags which play havoc with an angler's tackle. As a matter of fact it is doubted that any fisherman has escaped the perplexing and time-consuming difficulties which are encountered when, at least occasionally, the baited line has gotten caught and cannot be pulled or shook looose. When the difficulty cannot be overcome, as is frequently the situation, the fisherman not only loses a hook or a plug or highly prized hook-equipped lures but encounters the loss of time and patience in again rigging the line for practical use.

Briefly, all that is necessary here is to hook the attaching hooks 26 and 38 on the fishing line in the manner illustrated in FIGS. 1 and 2 and to let go whereby the weighted body 18 rides down the line and comes into contact with the retrievable plug or lure. The fact that the invention herein disclosed has been constructed and successfully used justifies the statement that in addition to the invention being readily attachable and detachable and successfully maneuverable, it well serves the purposes for which it is intended.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A retrieving device for a snagged fishing plug comprising: an elongated weighted plug striking and freeing body attachable to and adapted to slide down a fishing line attached at its lower end to the snagged plug, said body having a leading end which is convex and a trailing end which is flat and disposed at right angles to the long axis of the body, a first J-shaped hook having a shank portion lateral to the plane of said flat trailing end and having an end portion anchored in said flat end adjacent to but radially inward of an adjacent first marginal edge of said flat end and proximal to one lengthwise side of said body and a hook portion within the circumference of and spaced rearwardly from and bridging said flat end with its bill portion spaced from said flat end and also adjacent to but spaced radially inward from a second marginal edge of said body substantially diametrically opposite from said first marginal edge, and a second J-shaped hook, a duplicate of said first hook, opposed to but spaced in parallelism from the first hook and also having its shank portion likewise lateral to the plane of said flat end and having an attachable end portion anchored in and thus attached to said flat end adjacent to but radially inward of the second marginal edge of said body, and a hook portion spaced from said flat one end and directed toward the first-mentioned shank portion and with its bill portion proximal to but spaced from said first-mentioned shank portion, also spaced from said flat end and terminating adjacent to but radially inward of the first marginal edge and all portions of said J-shaped hooks being confined to a locale within the encompassing limits of said flat end, and means fixed to the flat end of said body for connecting a body lowering and retrieving line separate from the fishing line to the flat end only of said body.

2. The structure defined in claim 1 in which said lowering and retrieving line connecting means comprises an inverted U-shaped attaching eye for the lower end of said lowering and retrieving line, the limbs of said eye being embedded and fixed to said flat end inwardly of an adjacent portion of the aforementioned marginal edge, said eye compared to said first and second J-shaped hooks being relatively small, being eccentric with respect to said long axis and parallel to but spaced from said second hook and the bight portion of said eye being arched over by the shank and hook portions of said second hook.

References Cited by the Examiner

UNITED STATES PATENTS

| 2,074,057 | 3/37 | Kempe | 43—17.2 |
| 2,765,567 | 10/56 | Fifer | 43—17.2 |
| 2,800,738 | 7/57 | Allmann | 43—17.2 |
| 2,807,905 | 10/57 | Ford | 43—17.2 |
| 2,906,050 | 9/59 | Foster et al. | 43—17.2 |

FOREIGN PATENTS

| 13,116 | 1892 | Great Britain. |
| 14,525 | 1905 | Great Britain. |

SAMUEL KOREN, *Primary Examiner.*